(12) United States Patent
Marcoux

(10) Patent No.: US 8,215,814 B2
(45) Date of Patent: Jul. 10, 2012

(54) SOLID STATE OPTICAL ILLUMINATION APPARATUS

(75) Inventor: Éric Marcoux, Laval (CA)

(73) Assignee: DBM Reflex Enterprises Inc., Laval, Quebec (CA)

( * ) Notice: Subject to any disclaimer, the term of this patent is extended or adjusted under 35 U.S.C. 154(b) by 215 days.

(21) Appl. No.: 12/624,317

(22) Filed: Nov. 23, 2009

(65) Prior Publication Data

US 2010/0128488 A1    May 27, 2010

Related U.S. Application Data

(60) Provisional application No. 61/116,900, filed on Nov. 21, 2008.

(51) Int. Cl.
*F21V 5/00*    (2006.01)
(52) U.S. Cl. .................... 362/555; 362/310; 362/311.02; 362/335
(58) Field of Classification Search .................. 362/555, 362/310, 311.02, 308, 309, 335
See application file for complete search history.

(56) References Cited

U.S. PATENT DOCUMENTS

| | | | |
|---|---|---|---|
| 2,254,961 A | 9/1941 | Harris | |
| 5,924,788 A | 7/1999 | Parkyn, Jr. | |
| 5,926,320 A | 7/1999 | Parkyn, Jr. et al. | |
| 6,536,923 B1 * | 3/2003 | Merz | 362/327 |
| 6,607,286 B2 | 8/2003 | West et al. | |
| 6,674,096 B2 | 1/2004 | Sommers | |
| 6,741,351 B2 | 5/2004 | Marshall et al. | |
| 6,896,381 B2 | 5/2005 | Benitez et al. | |
| 7,006,306 B2 | 2/2006 | Falicoff et al. | |
| 7,009,213 B2 | 3/2006 | Camras et al. | |
| 7,118,236 B2 | 10/2006 | Hahm et al. | |
| 7,153,002 B2 | 12/2006 | Kim et al. | |
| 7,246,931 B2 * | 7/2007 | Hsieh et al. | 362/612 |
| 7,390,117 B2 | 6/2008 | Leatherdale et al. | |
| 7,841,750 B2 * | 11/2010 | Wilcox et al. | 362/334 |
| 7,959,326 B2 * | 6/2011 | Laporte | 362/249.02 |
| 2005/0151141 A1 | 7/2005 | Grotsch et al. | |

(Continued)

FOREIGN PATENT DOCUMENTS

| | | |
|---|---|---|
| CA | 2 615 706 | 9/2006 |
| EP | 1 528 603 A2 | 5/2005 |
| WO | WO 2008/122941 A1 | 10/2008 |

*Primary Examiner* — Peggy A. Neils
(74) *Attorney, Agent, or Firm* — Ipaxio S.E.N.C.

(57) ABSTRACT

An optical system having a solid state light source, such as an LED of any spectrum, includes a lens that provides an output illumination pattern of uniform distribution over a remote and larger target. The lens does not have an axis of revolution. The lens has a generally non-circular outer shape in cross section and on top views, where the outer optical surfaces are angled one relative to another. The lens includes refractive and reflective active optical surfaces to split, direct and shape the incoming beam from the light source towards the target in the form of several angled beams of prescribed energies calculated as a function of the shape of the target and distance to the target. The lens has an inner primary and partially open optical cavity of a polygonal cross section facing the light source. This optical cavity has a number of refractive optical surfaces whose shape and number is determined by the number of and shape of the illumination beams generated in conjunction with the other surfaces of the lens. This novel optical system may include an array of white LEDs that generate the input illumination to an array of these lenses to insure the proper illumination level and uniformity at particular remote targets.

4 Claims, 13 Drawing Sheets

U.S. PATENT DOCUMENTS

| | | |
|---|---|---|
| 2007/0201225 A1 | 8/2007 | Holder et al. |
| 2007/0257270 A1 | 11/2007 | Lu et al. |
| 2007/0279904 A1 | 12/2007 | Tasch et al. |
| 2008/0212319 A1 | 9/2008 | Klipstein |
| 2008/0247173 A1* | 10/2008 | Danek et al. .................. 362/309 |
| 2009/0296407 A1* | 12/2009 | Bailey .......................... 362/309 |
| 2010/0039810 A1* | 2/2010 | Holder et al. ................. 362/235 |
| 2010/0118531 A1 | 5/2010 | Montagne |

* cited by examiner

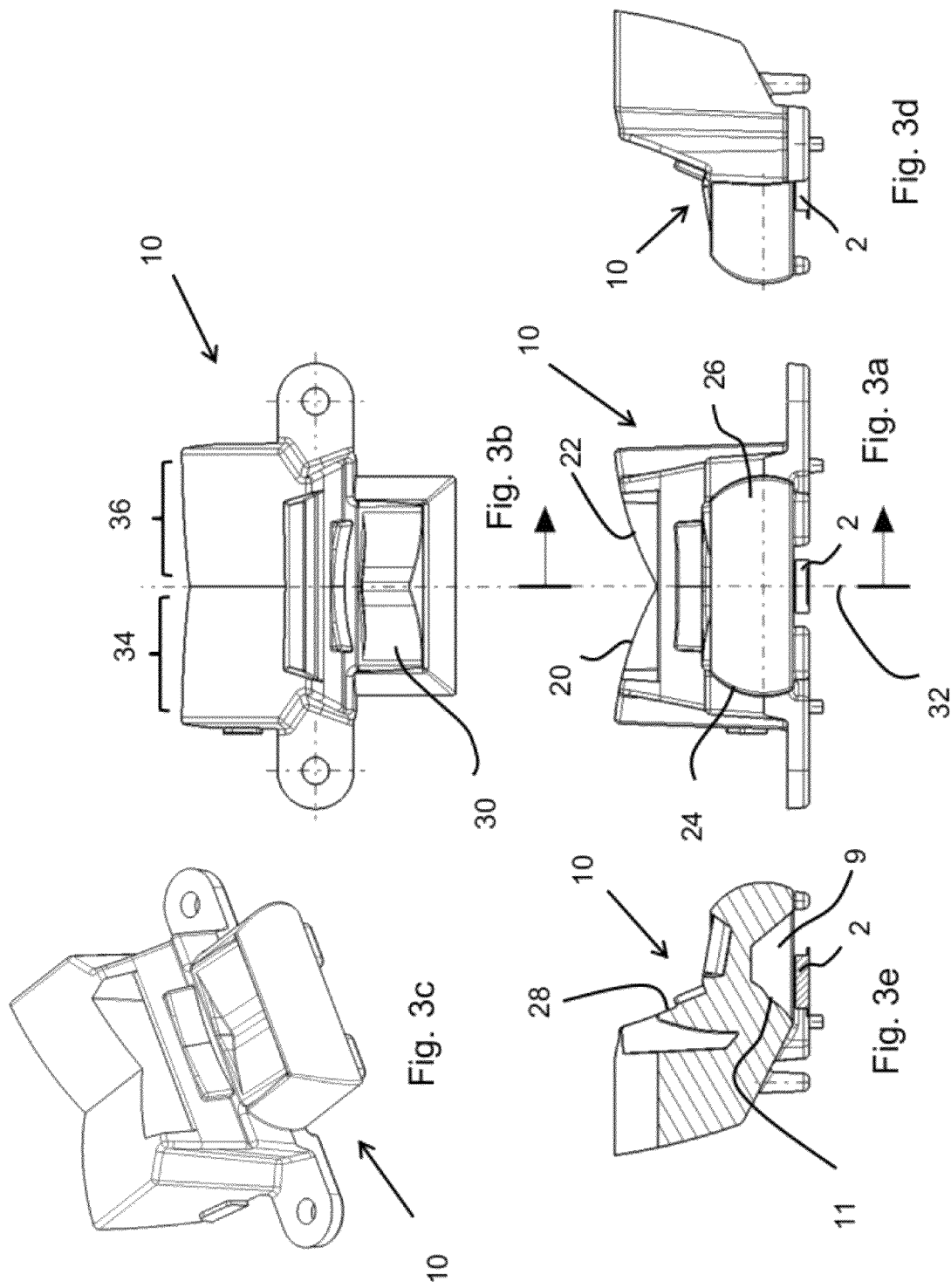

Beam "A"  Spot "A"

Beam "B"  Spot "B"

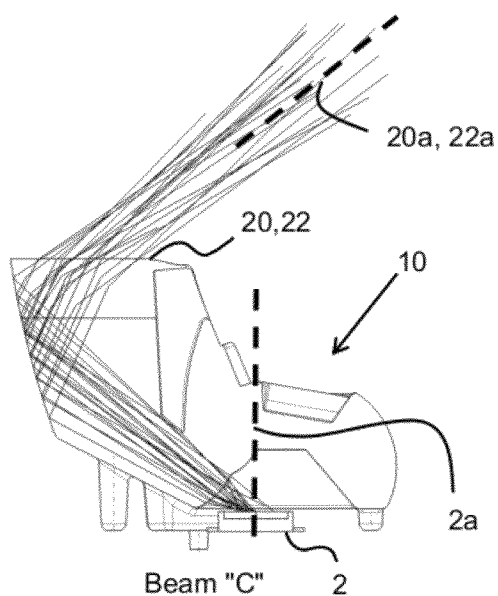
Beam "C"
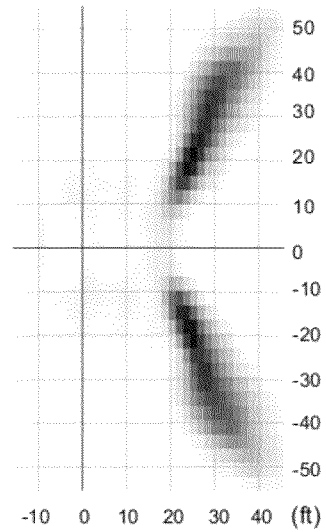
Spot "C"
Fig. 4c
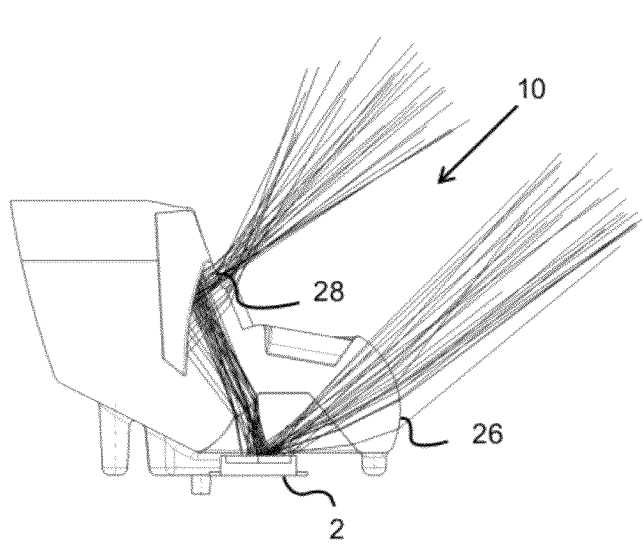
Beams "A+B"
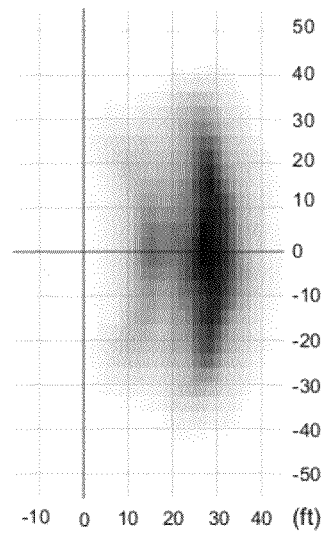
Spots "A+B"
Fig. 4d Beams "A+B+C"  Spots "A+B+C"

Beam "D"  Spot "D"

Spots
"A+B+C+D+E"

SOLID STATE OPTICAL ILLUMINATION APPARATUS

This application claims benefit of Ser. No. 61/116,900, filed 21 Nov. 2008 in the U.S. and which application is incorporated herein by reference. To the extent appropriate, a claim of priority is made to the above disclosed applications.

FIELD OF INVENTION

The present invention relates to an illumination apparatus including a solid state light source and a lens to provide uniform illumination at a remote target. More particularly, the present invention relates to an illumination apparatus including a solid state illumination source and a lens that generates multiple angled beams of a certain shape and energy distribution towards a remote and large target.

BACKGROUND

Solid state illumination sources and optical systems have been extensively used in many applications, such as in bar code readers, optical communication systems, flat image displays, CD and DVD players.

More recently white LEDs and specially designed lenses have found applications for outdoor illumination systems due to significant savings in energy, easiness of mass production or service and much longer life expectancy.

Great efforts in the lens design for LED illumination are required to meet more demanding day to day applications where the shape and the illumination level of the light beam at a remote target have to meet above normal standards and regulations. Both the patent and technical literature provide design and manufacturing solutions for solid state and especially LED remote illumination solutions.

Reference is made in this regard to U.S. Pat. No. 7,009,213 to Camras that teaches an LED based illumination system having a specially designed lens.

Reference is made in this regard to WO 2008/122941 to Montagne that teaches an LED based luminary head to illuminate high aspect ratio rectangular targets such as public roads.

One can distinguish here optical systems for solid state illumination applications where the input beam (IB) from the source and the output beam (OB) coming out from a lens facing the LED have axis that are at least partially collinear and/or parallel.

Reference is made in this regard to U.S. Pat. No. 2,254,961 to Harris, U.S. Pat. No. 5,924,788 to Parkyn and U.S. Pat. No. 6,896,381 to Benitez.

U.S. Pat. No. '381 to Benitez teaches an open optical cavity facing the LED and in the proximity of the LED, this cavity having an axis of revolution and a circular cross section in a plane perpendicular to the incoming light beam from the LED. The optical cavity has a spherical refractive surface that accepts the incoming beam from the LED.

There are also other applications where the input beam (IB) and the output beam (OB) are at an angle calculated to meet certain illumination criteria.

Reference is made in this regard to U.S. Pat. No. 6,607,286 to West, U.S. Pat. No. 6,674,096 to Sommers, U.S. Pat. No. 7,006,306 to Falicoff, U.S. Pat. No. 7,118,236 to Hahm, U.S. Pat. No. 7,153,002 to Kim, U.S. Pat. No. 7,390,117 to Leatherdale, US Patent Application 2007/0257270 to Lu, US Patent Application 2007/0201225 to Holder and EP 1,528,603 to Herbert.

Further reference is made here to commercially available LED based illumination systems produced by companies such as Led Prescriptions Innovators (LPI), Illumination Management Solutions (such as LED LightBARS™), Sekonix, Joliet, Led-Spot Ledil (such as Flare Lens™ and Snow White Lens™).

In U.S. Pat. No. 6,674,096 the lens and the LED source form a single package. In U.S. Pat. No. 7,390,117 to Leatherdale the lens and the source LED die are separated. In U.S. Pat. No. 6,607,286 to West an optical cavity having an axis of revolution and a circular shape in cross section covers and encapsulates the LED die. Contrary to West '286 in U.S. Pat. No. 7,153,002 to Kim the lens has an optical cavity remote from the LED and fully enclosed in the lens body. This cavity provides both reflective and refractive surfaces to direct the beam towards a direction to a target that is angled from an axis that is normal to the LED die. U.S. Pat. No. 5,926,320 to Parkyn also teaches an enclosed air gap cavity In most cases disclosed in patent literature the lenses used in conjunction with solid state light sources, such as LEDs, have a circular perimeter having an axis of reference going through the LED die. Such a circular perimeter lenses are used in street illumination, such as in FIGS. 21-26 of US 20070201225 to Holder. FIGS. 21-25 of Holder '225 show a composite lens having several sub-lenses, each having a "blob" or a dome shaped lens portions. This portion can be seen as a sub-lenses that generate several illumination beams upon a target, such as a street. WO 2008122941 to Montagne shows a two lobs LED lens for street illumination where each lob has a circular parameter U.S. Pat. No. 7,390,117 to Leatherdale teaches several designs where the LED lens has a single body that has a polygonal perimeter, these lenses being made of two optical materials for use in lateral illumination.

There is a need to further improve the solid state illumination systems for applications where the energy and the shape of the light beams at the level of a target meet increased demanding criteria without complicating the design of the lens or making them more complicated.

SUMMARY OF THE INVENTION

The present application teaches an improved solid state illumination system for a variety of applications such as public roads, large billboards, parking areas, gas stations, street signs or sport arenas (tennis courts, hockey rinks, etc.) that require constant or uniform illumination over the entire surface with some restrictions to contain the illumination pattern. In some of these applications, such as public roads, billboards and sport arenas the illumination beam has to be limited to a direction or several directions and prevent the illumination over other directions with respect to the illumination source.

This is achieved according to an aspect of this invention by using a white LED and a molded lenses of a complex shape that generate a number of output beams towards the target having prescribed energy levels and shapes at the target. The output beams form an angle with respect to an axis that is perpendicular to the LED die.

According to an aspect of this invention the energy level and the desired shape at the target is achieved by using an array of LED lenses and an array of complex shaped lenses, where the lenses has an identical shape and output beams. In some cases the number of lenses and the number of LEDs are not the same, i.e. several lenses are used in conjunction with a single LED, or several LEDs are used in conjunction with a single lens.

According to an aspect of this invention, the illumination lens does not have an axis of revolution. In cross sections the lens has an external polygonal shape in planes perpendicular to an axis that is perpendicular to the LED die. The lens may have any number of external surfaces each having an optical function and a main direction of illumination towards a target.

According to an aspect of this invention, the complex shape lens has an inner optical cavity in the proximity of the LED die making no contact with the LED. This inner optical cavity is partially open towards the LED die to allow the incoming beam or light rays from the LED die to travel without any bending towards the refractive optical surfaces of the cavity.

According to an aspect of this invention the lens may have one or several air gaps between sub-lens elements that form the lens.

According to an aspect of this invention the lens has a number of optical surfaces providing total internal reflection (TIR)

According to an aspect of this invention the refractive and the reflective surfaces of the lens can be continuous, can be flat (i.e. no optical power), can be cylindrical, spherical or aspherical.

According to an aspect of this invention these optical refractive and reflective surfaces can be further multi-facetted or micro-structured to further alter the energy and/or spatial distribution of the beams.

According to an aspect of this invention these optical refractive and reflective surfaces have no mirror coatings.

According to an aspect of this invention the LED and the lens generate a number of out coming illumination beams only from one side of a plane to prevent the illumination of an area proximate to the desired illumination target.

According to an aspect of this invention the LED and lens illumination system is used for a novel street illumination apparatus that provides reduced energy consumption and improved illumination uniformity at the street level.

According to an aspect of this invention the LED and lens illumination system is used for a novel (indoor or outdoor) billboard illumination apparatus that provides reduced energy consumption and improved illumination uniformity at the billboard level without affecting adjacent areas that have to be protected from the illumination.

BRIEF DESCRIPTION OF THE DRAWINGS

The invention can be more understood from the following drawings that are intended to provide stand alone or additional and specific design details that do not limit the scope of the invention. Sizes and shapes of the elements of the lens and LED dies in the drawings are approximate and may not be at scale.

FIGS. 3 (*a-b-c-d-e*) show other views of the embodiments shown in FIG. 2 of the current invention.

DETAILED DESCRIPTION OF THE INVENTION

Stated broadly, the present invention is directed to an optical system having a solid state light source, such as an LED of any spectrum. The system includes a lens that provides an output illumination pattern of uniform distribution over a remote and larger target. The lens does not have an axis of revolution. The lens has a generally non-circular outer shape in cross section and on top views, where the outer optical surfaces are angled one relative to another. The lens includes refractive and reflective active optical surfaces to split, direct and shape the incoming beam from the light source towards the target in the form of several angled beams of prescribed energies calculated as a function of the shape of the target and distance to the target. The lens has an inner primary and partially open optical cavity of a polygonal cross section facing the light source. This optical cavity has a number of refractive optical surfaces whose shape and number is determined by the number of and shape of the illumination beams generated in conjunction with the other surfaces of the lens. This novel optical system may include an array of white LEDs that generate the input illumination to an array of these lenses to insure the proper illumination level and uniformity at particular remote targets.

Figure 1A:
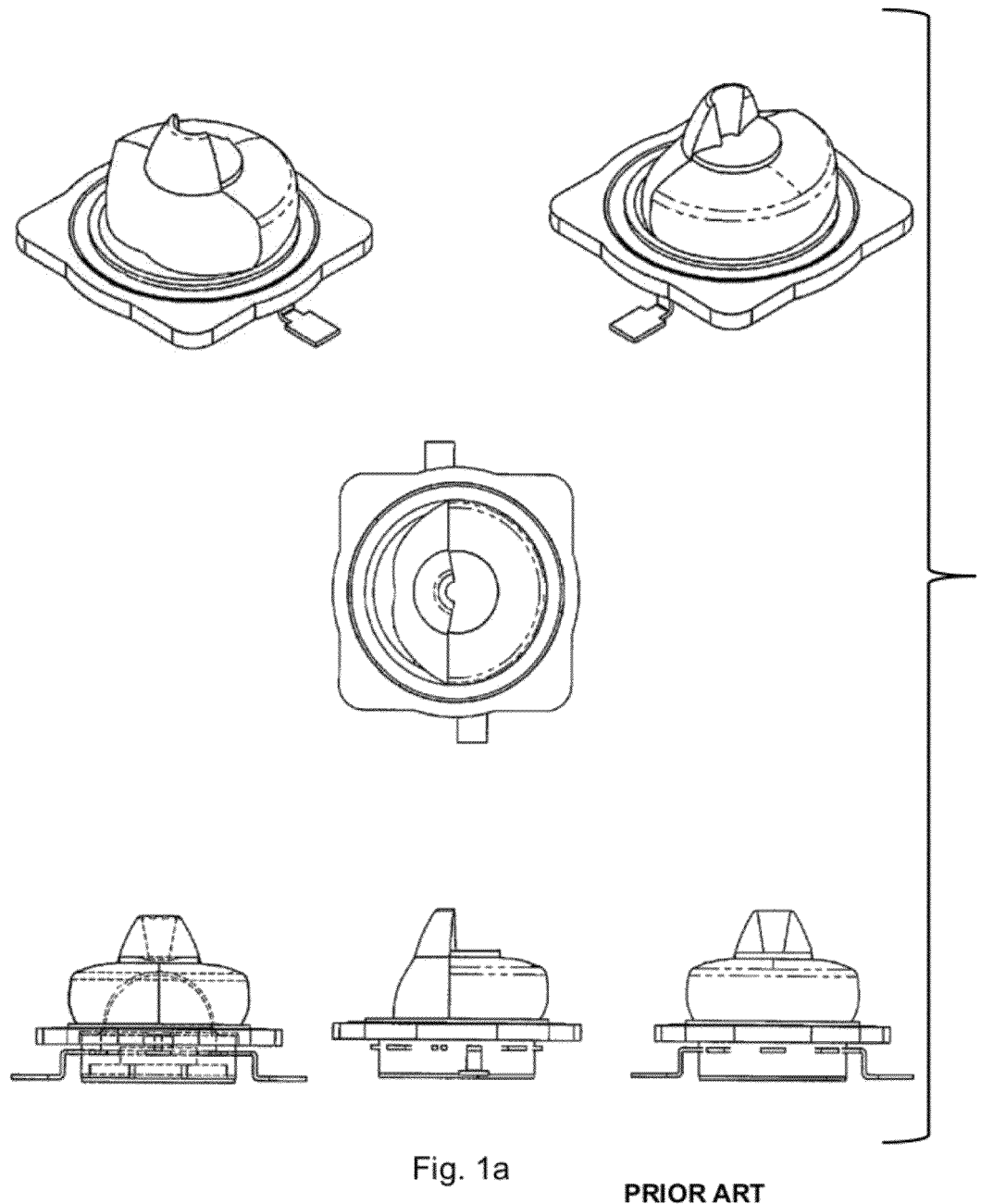
FIGS. 1 (*a-b-c-d*) show prior art designs used for street illumination.
Figure 1B:
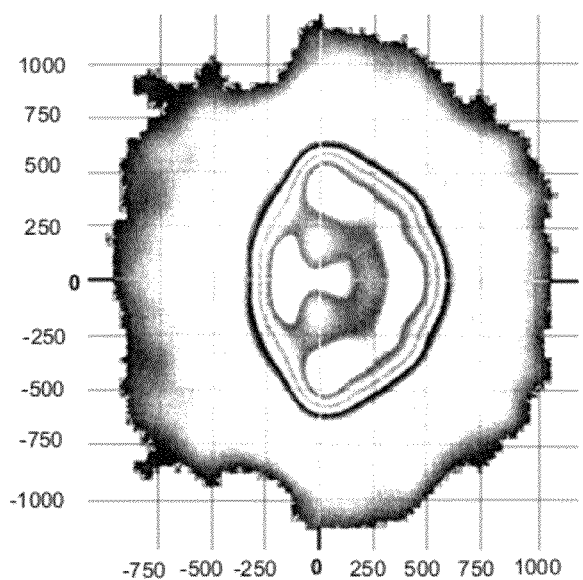
Figure 1C:
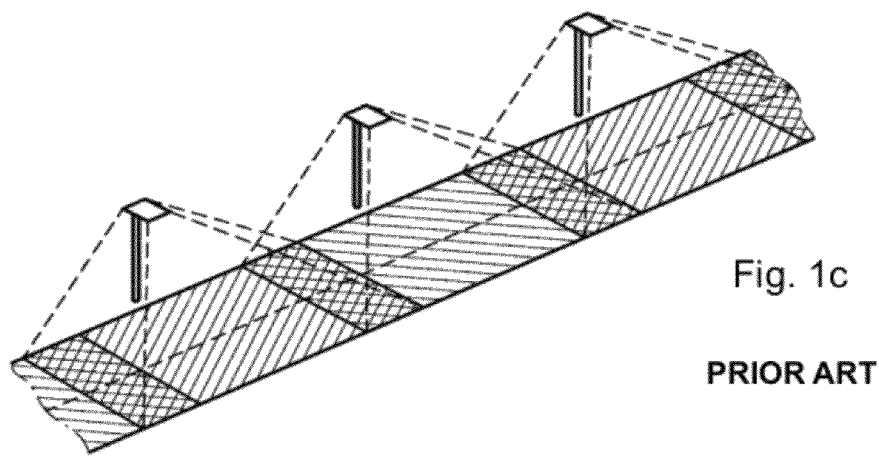
Figure 1D:
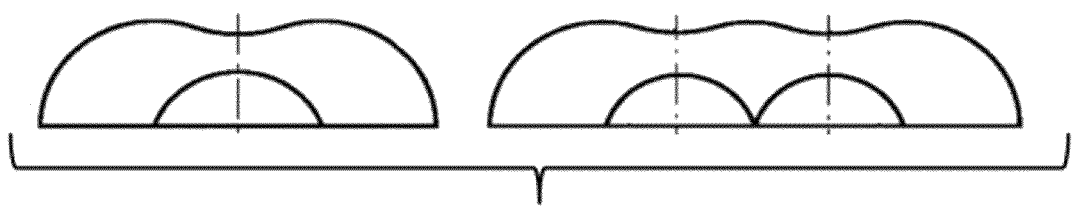
Figure 2A:
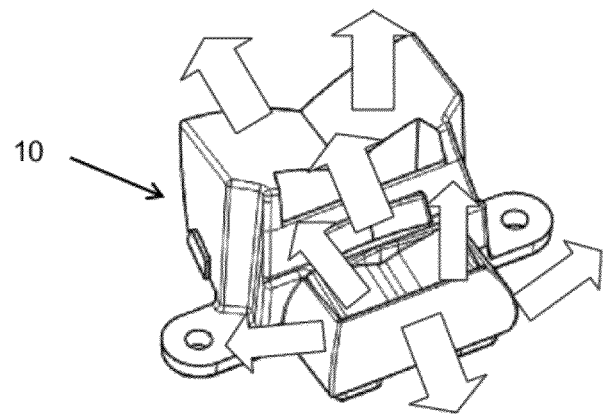
FIGS. 2 (*a-b-c-d*) show embodiments of the lens and the illumination pattern as disclosed in the current invention.
Figure 2B:
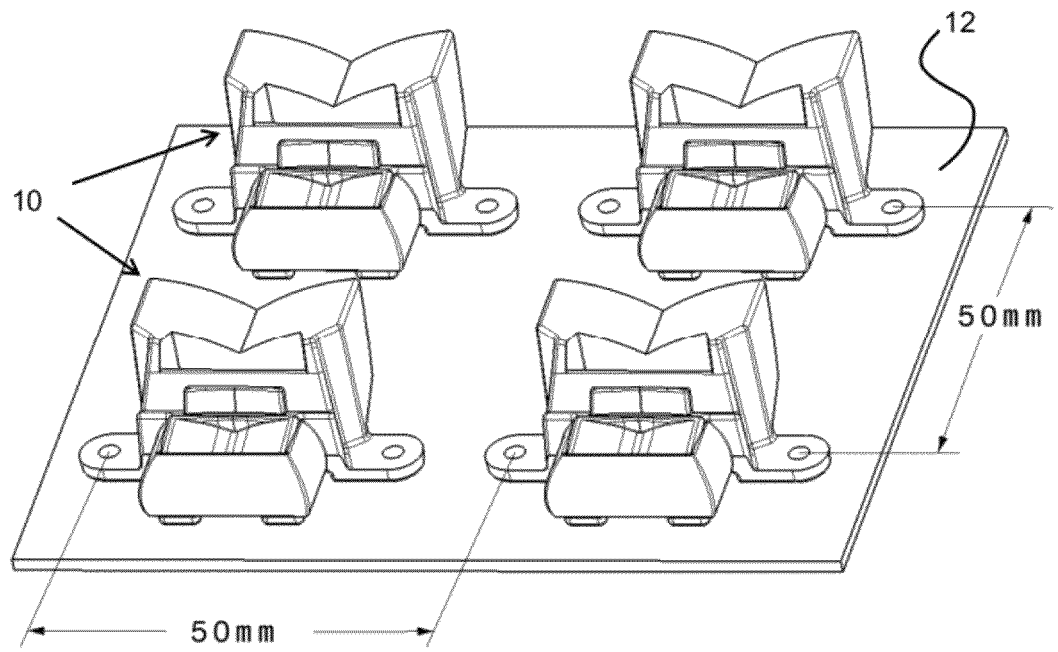

Referring now to the Figures, and more particularly FIGS. 2*a* and 2*b*, there is shown an array of four illumination apparatuses 10 according to the invention.

Each apparatus 10 lies on support 12. In some cases, depending on the illumination requirements, a single apparatus may no be sufficient, and therefore the present invention contemplates an array of such apparatuses.

As shown in FIG. 2*a* by the large arrows, the light emitted by the apparatus can exit from any number of facets of the lenses which form part of the apparatus, as will be apparent hereinafter.

Figure 2C:
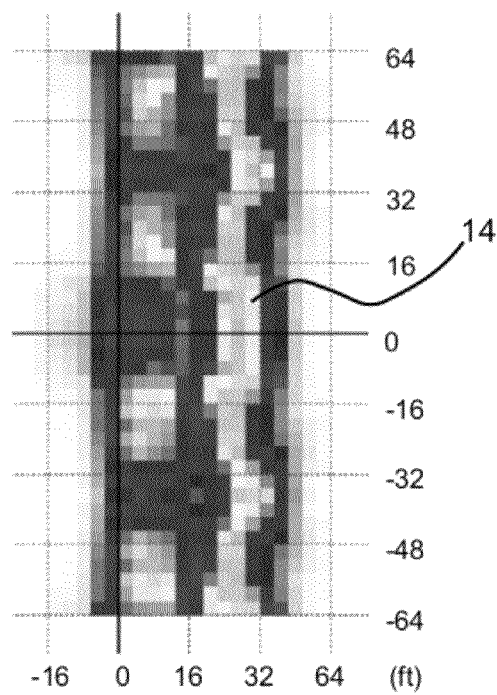
Figure 2D:
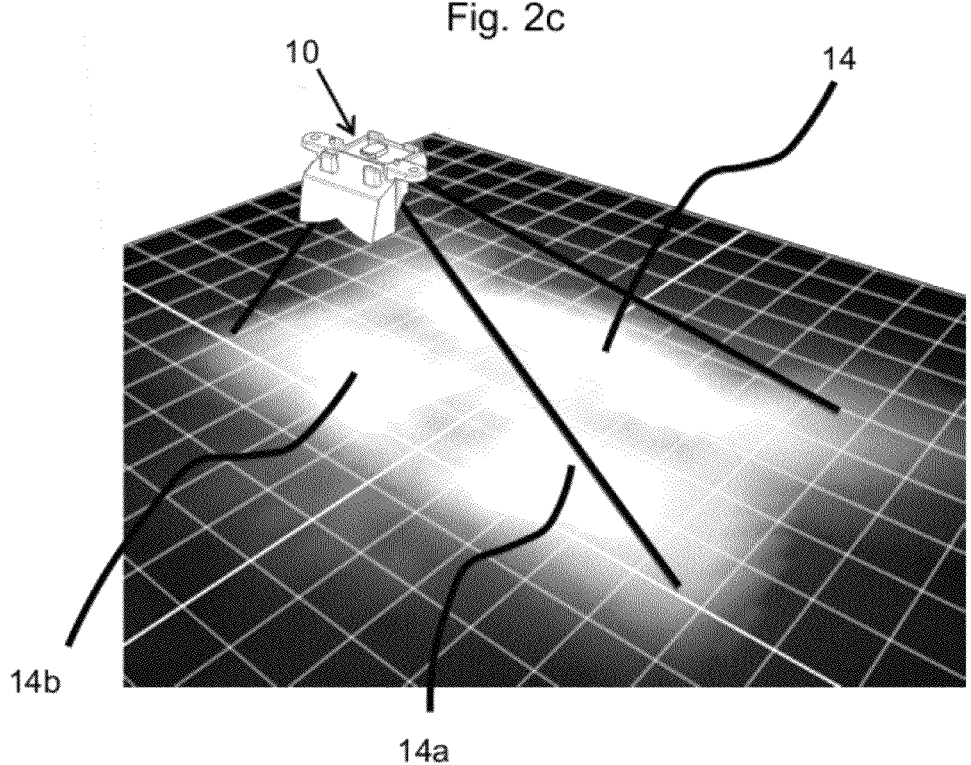

The lens of FIG. 2*a* permits illumination along predetermined regions. More particularly, the lenses are so arranged to permit an illumination pattern shown in FIG. 2*d*: two shorter patterns 14*a* and 14*b*, and a longer pattern 14, which is adjacent the patterns 14*a* and 14*b*. The illumination pattern values are shown in FIG. 2*c*.

FIGS. 3*a*-3*e* show the apparatus according to a preferred embodiment of the invention. The LED 2 lies on a die (not shown in this Figure). The LED is physically separated from the lens by cavity 9 (FIG. 3*e*) which has a surface 11 for refracting the beam coming from the LED 2.

The lens itself is made of a plurality of sub-lenses 20, 22, 24, 26 and 28, which cooperate together to achieve the objects of the invention. These sub-lenses 20, 22, 24, 26 and 28 each have a sub-axis 20*a*, 22*a*, 24*a*, 26*a* and 28*a*, respectively. Lenses 20 and 22 are mirror images of each other about a median plane or axis 32. One aspect of the invention also lies in the quasi-square outline of the lens (or rectangular), as opposed to circular or oval lenses. This permits a more precise beam shaping, allowing rectangular illumination patterns.

FIG. 3*b* is a top view of the apparatus, showing how it is separated by plane 32 into two portions, 34 and 36.

FIG. 3*d* is a side view of the apparatus, rotated 90 degree clockwise, whereas FIG. 3*e* is a sectional view of the apparatus, taken along line A-A of FIG. 3*b*.

The lenses are so designed to provide an illumination pattern along a target area that is remote from the apparatus 10 along a reference axis. This reference axis is not illustrated, but can be thought of being towards top of FIG. 3a, that is straight up.

The light beam emerging from LED die 2 around a LED axis of reference 2a is received by optical cavity 9 whose function is to split the beam into a plurality of beams via optical refraction as the light travels from an air space into the lens body and it goes through refractive surfaces 11. The complex shape of surface 11 generates a plurality of beams such as beams that make an angle with respect to a normal axis perpendicular to the plane of the LED die. This is done purposely to achieve a beam restricted illumination over a target. In other words, the illumination system 10 consists of an array of lenses and LEDs that create a uniform beam of light over a target (see for example FIGS. 5a and 5b). In order to compensate for the inherent difference of the light beam uneven projection that creates a ΔL path difference that translates into a difference in the intensity of light, the lenses covered by the current inventions have been designed to manage the light flux in a manner that ensures not only a uniform illumination at the target but also a light pattern that is either rectangular or square.

The optical cavity can be of various shapes, such as domed or circular, or even rectangular. The cavity allows a better manipulation of the beam emitted by the LED, and therefore allows greater freedom in the design of the lenses for the specific purposes of the apparatus.

Figure 4A:
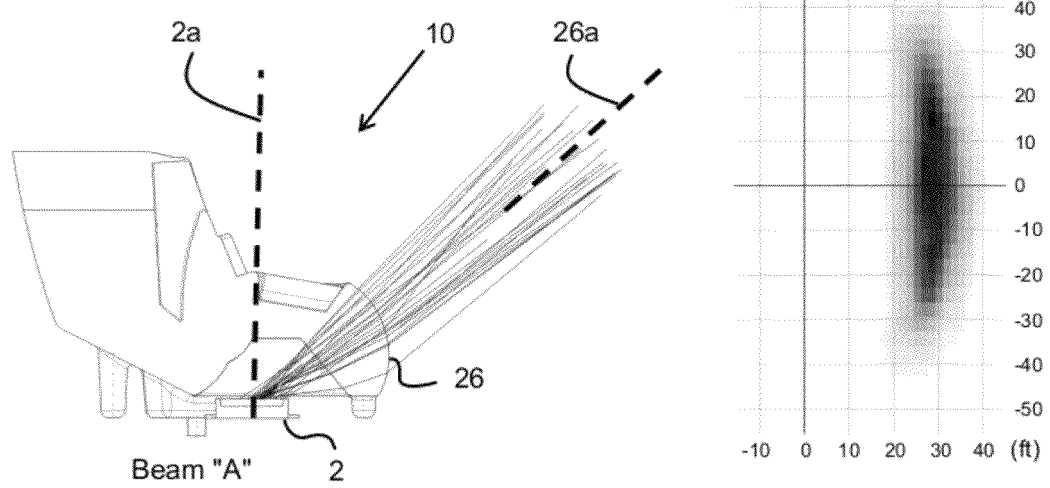
FIGS. 4 (*a-b-c-d-e-f-g-h*) show ray tracings through the embodiments of FIG. 3.
Figure 4B:
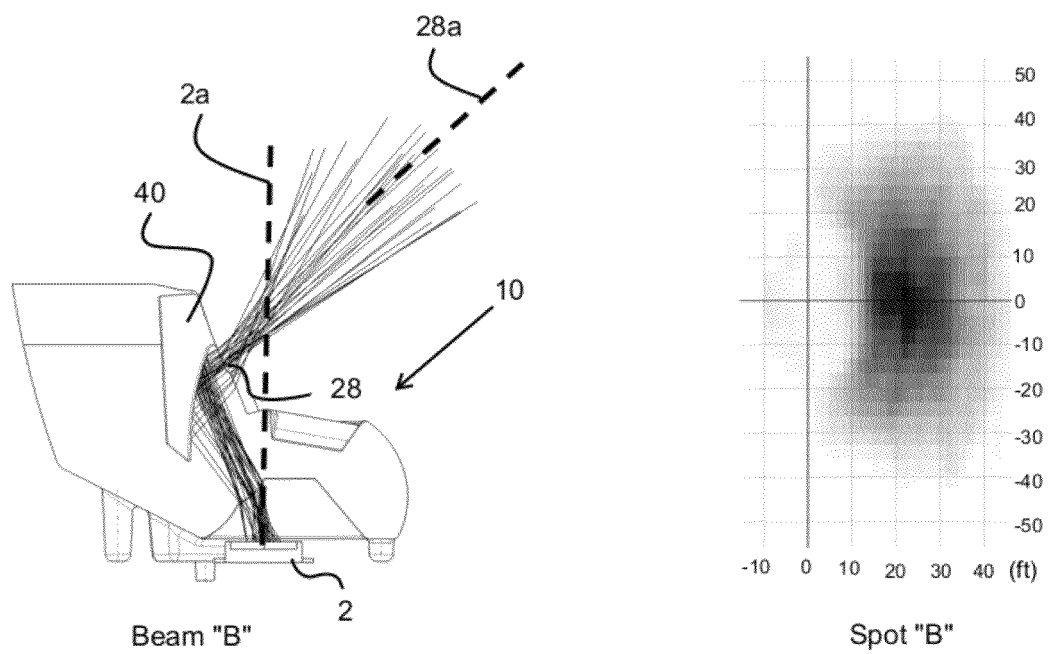
Figure 4E:
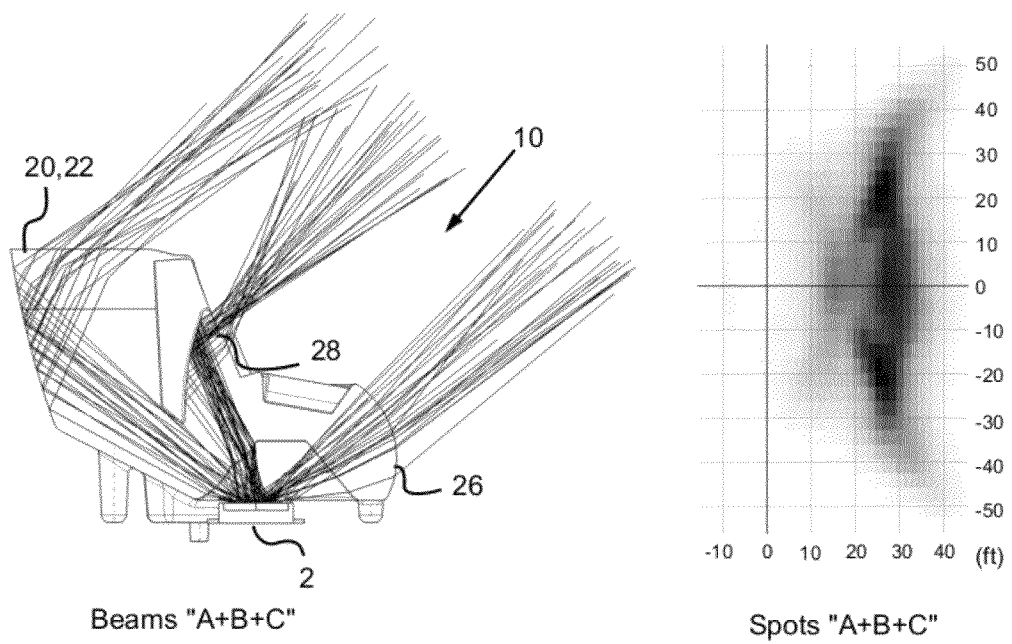

Referring now to FIGS. 4a-4h, there is shown the various ray tracings of the light as it exits the lens. In FIG. 4a, the light exits along surface 26. In FIG. 4b, light exits along surface 28 because of the presence of the air gap 40 that separates this portion of the optical lens 10 from the portion where the surfaces 20 and 22 forming the dome shaped lenses is located. In FIG. 4c, light exits along surface 22 or 20. To the right of each of these figures, there is shown the illumination spot of the beam. FIG. 4d shows the ray tracing for the combination of FIGS. 4a and 4b, and its resulting pattern. FIG. 4e shows the ray racing of the combination of FIGS. 4a-4c. These are all figures taken along the side of the apparatus.

Figure 4F:
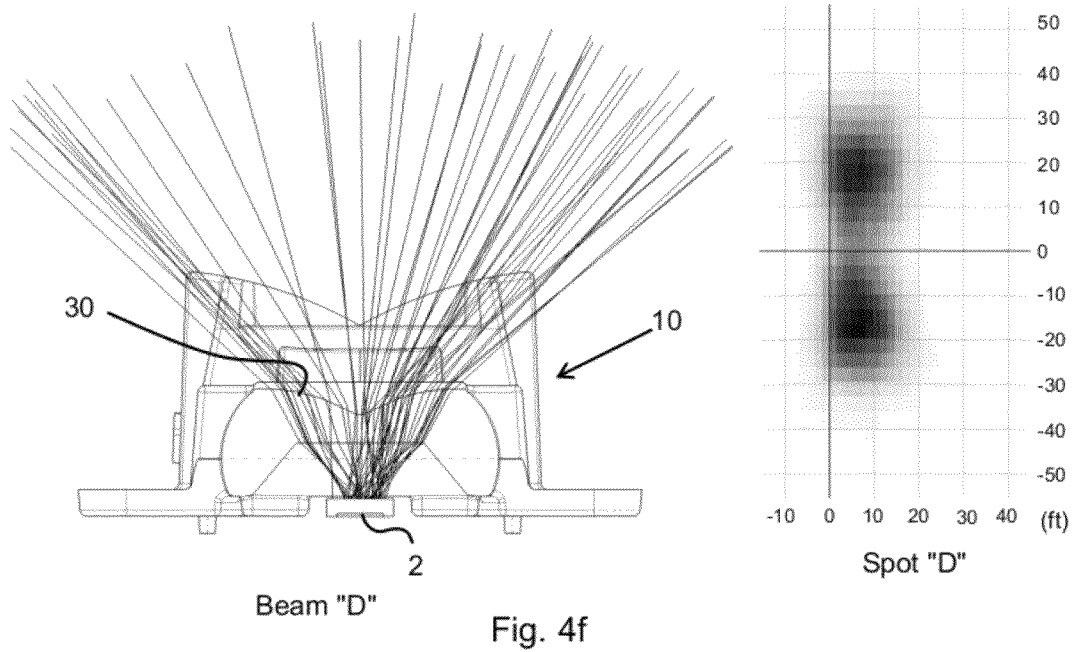
Figure 4G:
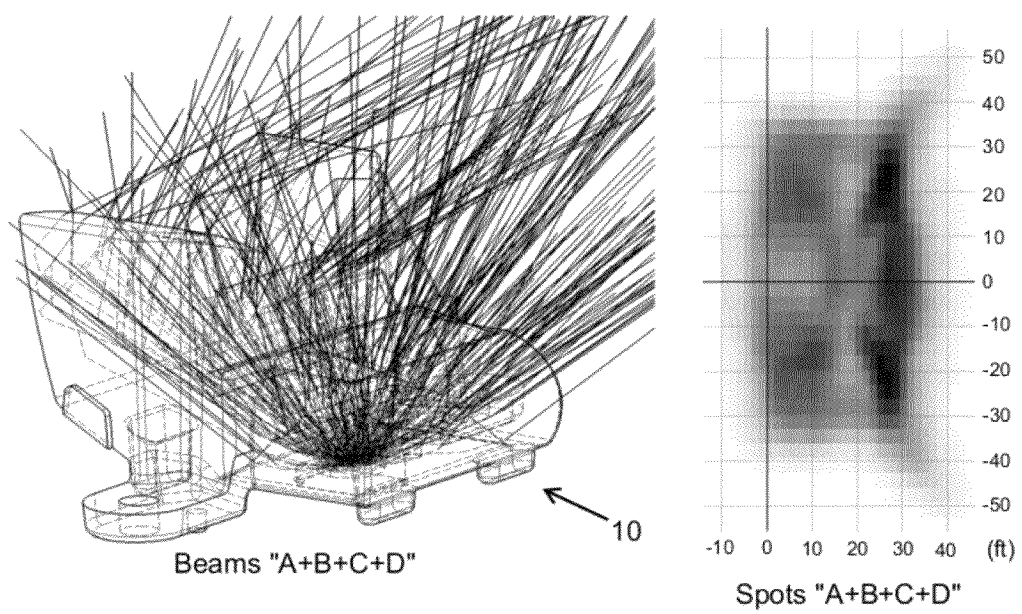
Figure 4H:
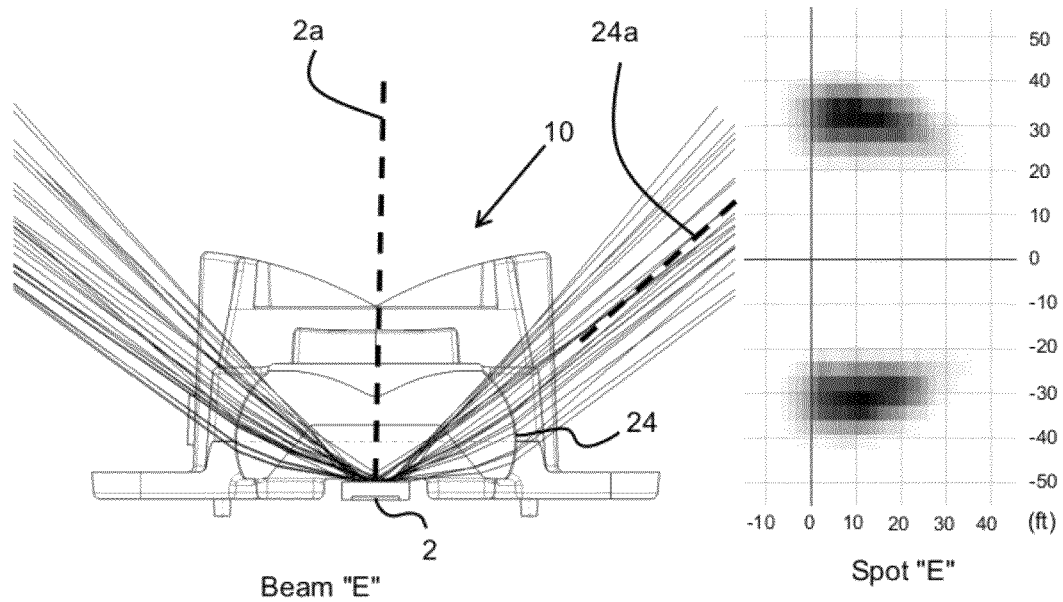

FIG. 4f is a front view of the apparatus, and shows the light exiting along surface 30, whereas FIG. 4h shows the light exiting from surface 24.

Figure 5A:
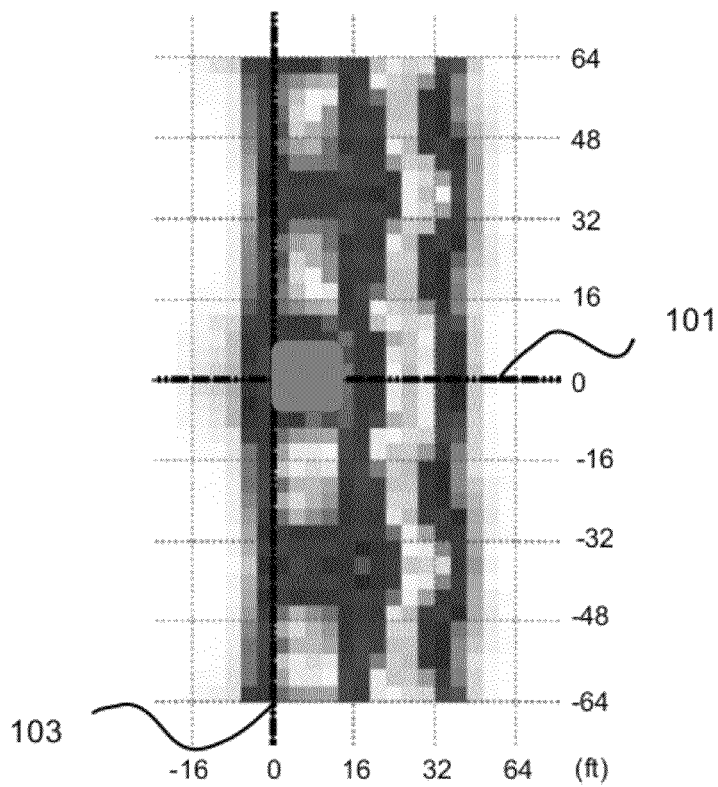
FIGS. 5 (*a-b*) show the illumination pattern at the target achieved by the lenses shown in FIGS. 6 (*a-b*) show the division of light in two quadrants and the illuminated and non illuminated areas.
Figure 5B:
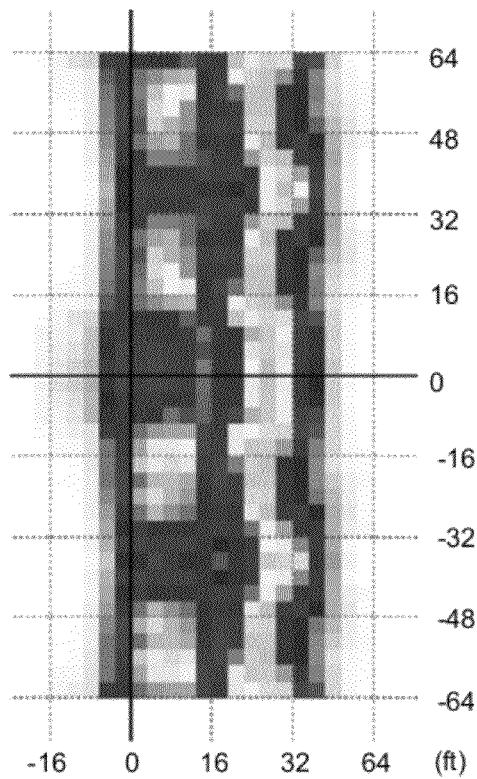
Figure 6A:
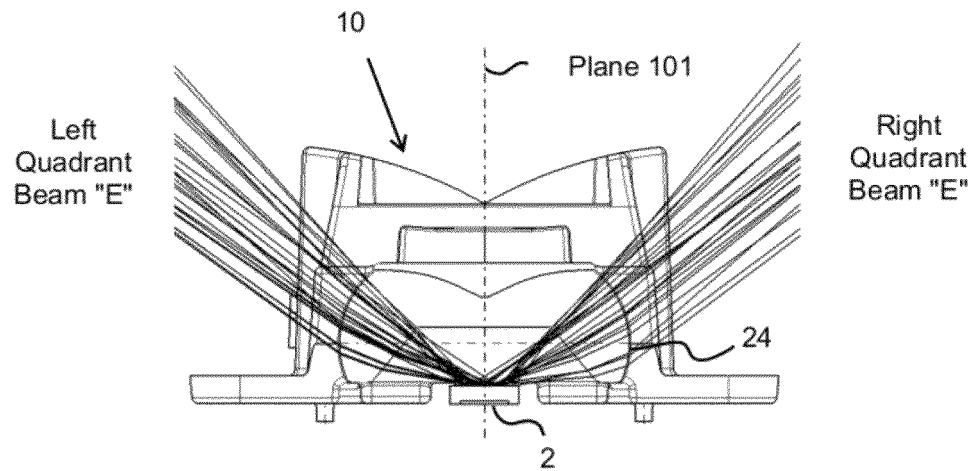
Figure 6B:
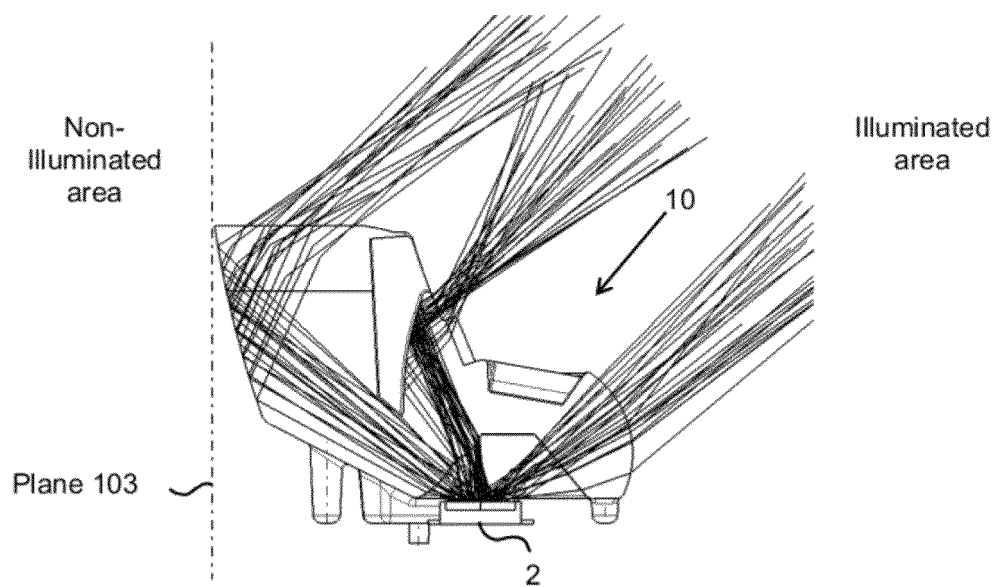
Figure 7:
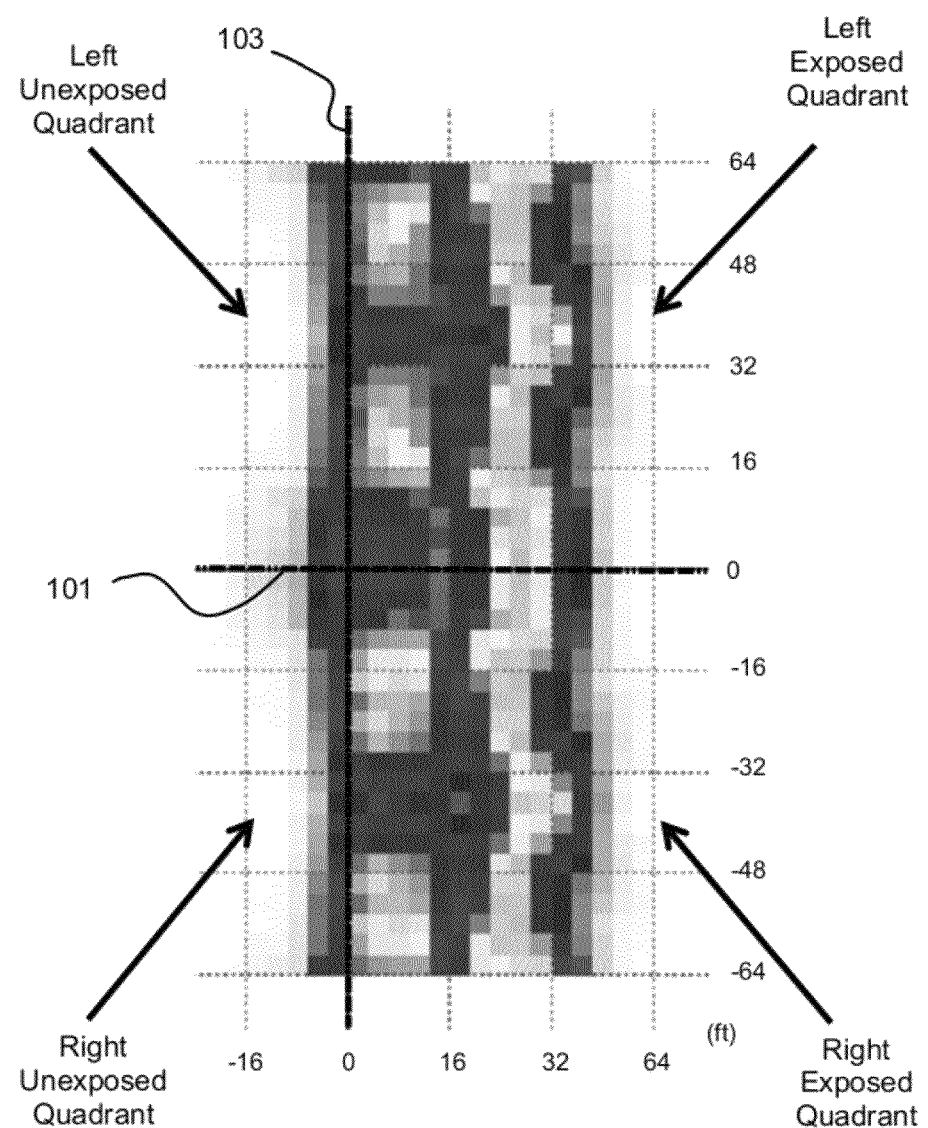
FIG. 7 shows sections of the illumination area according to the invention.
Figure 8:
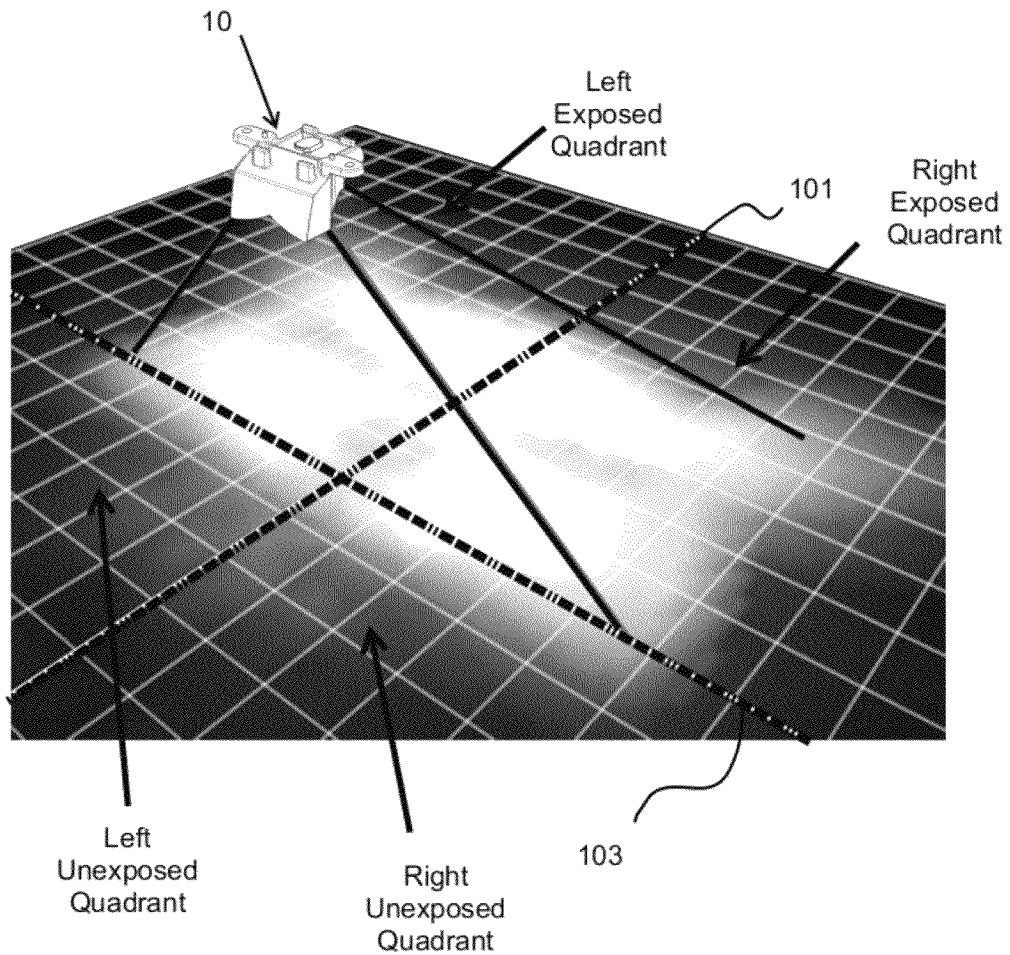
FIG. 8 shows sections of the illumination area according to the invention.

The combination of all of the rays of light produces the pattern shown in FIGS. 5a and 5b, the difference between the two figures being the fact that 5a shows the apparatus 10 as well as planes 101 and 103. Plane 101 separates the light pattern into left and right quadrants, whereas plane 103 limits the lighted area along a predetermined path delimited by the rear of the apparatus (as seen from the side view of FIG. 6b, and is actually parallel to the reference axis, and offset thereto (see the z-axis label in FIG. 6b). FIGS. 7 and 8 are different representations of this effect.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A solid state based illumination apparatus comprising:
an LED die having a support and an LED axis of reference to generate a light beam around the LED axis of reference;
an optical lens having a lens body and an optical cavity to receive the light beam generated by the LED, the optical cavity having a refractive surface for deflecting the light beam generated by the LED, the optical lens being separate from the LED die, the optical lens further comprising:
a plurality of sub-lenses forming together the lens body, the sub-lenses including optical surfaces that reflect and refract portions of the light beam along sub-axes that are angled with respect to the LED axis of reference and where the sub-lenses include two identical dome shaped lenses, one dome shaped lens being the mirror image of the other with respect to a median plane that divides the optical lens into two halves to create two spot light patterns onto a remote target along two of the sub-axes and where a third sub-lens located adjacent said dome shaped lenses that is separated by an air gap from the dome shaped lenses creates a non-circular spot light pattern along another one of the sub-axes that is offset with respect to the two sub-axes of the dome shaped lenses to create a spot light pattern at the target that is adjacent the spot light patterns created by the dome shaped lenses and where the third sub-lens has a polygonal exit optical surface to generate the non-circular spot light pattern at the target to complement the two spot light patterns of the dome shaped lenses and create a composite polygonal illumination pattern at the target.

2. The illumination apparatus according to claim 1 wherein the rays refracted by the dome shaped lenses make an angle with respect to the LED axis of reference.

3. The illumination apparatus according to claim 1 wherein the dome shaped lenses are opposed to one another.

4. The illumination apparatus according to claim 1 wherein the dome shaped lenses have a common edge portion and make an angle one with respect to the other.

* * * * *